US010640291B2

(12) United States Patent
Iida

(10) Patent No.: US 10,640,291 B2
(45) Date of Patent: May 5, 2020

(54) ARTICLE REARRANGING APPARATUS

(71) Applicant: Daifuku Co., Ltd., Osaka-shi (JP)

(72) Inventor: Masaru Iida, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 9 days.

(21) Appl. No.: 16/243,262

(22) Filed: Jan. 9, 2019

(65) Prior Publication Data

US 2019/0218040 A1 Jul. 18, 2019

(30) Foreign Application Priority Data

Jan. 12, 2018 (JP) ................................. 2018-003627

(51) Int. Cl.
*B65G 1/137* (2006.01)
*B65G 47/51* (2006.01)

(52) U.S. Cl.
CPC ....... *B65G 1/1378* (2013.01); *B65G 47/5104* (2013.01); *B65G 47/5113* (2013.01)

(58) Field of Classification Search
CPC .............. B65G 1/1378; B65G 47/5104; B65G 47/5113; B65G 47/5118; B65G 47/5127
USPC ..................................................... 198/347.1
See application file for complete search history.

(56) References Cited

U.S. PATENT DOCUMENTS

| | | | | |
|---|---|---|---|---|
| 3,272,307 A * | 9/1966 | Waite | ................... | B65G 47/647 198/435 |
| 3,580,141 A * | 5/1971 | Richter | ................... | B65H 29/16 493/27 |
| 4,835,702 A * | 5/1989 | Tanaka | ................. | B65G 1/1378 414/398 |
| 7,775,344 B2 * | 8/2010 | Balk | .................... | B65G 17/005 198/575 |
| 9,760,086 B2 * | 9/2017 | Woodtli | ............... | B65G 1/0492 |
| 9,938,079 B1 * | 4/2018 | Vogel | ..................... | B65G 47/57 |
| 9,938,081 B2 | 4/2018 | Gondoh et al. | | |
| 10,144,595 B2 * | 12/2018 | Philipp | ............. | B65G 47/5109 |
| 2007/0271875 A1 * | 11/2007 | Mott | ..................... | B65G 1/133 53/443 |

(Continued)

FOREIGN PATENT DOCUMENTS

| | | |
|---|---|---|
| EP | 3272680 A1 | 1/2018 |
| JP | 4361918 A | 12/1992 |

*Primary Examiner* — Gene O Crawford
*Assistant Examiner* — Keith R Campbell
(74) *Attorney, Agent, or Firm* — The Webb Law Firm

(57) ABSTRACT

A control unit controls a sorting unit and a send-out unit to transport articles received by a receiving unit to an upstream accumulating unit so that articles that belong to the same article group are accumulated on the same upstream branch accumulating unit, and articles that belong to different article groups are accumulated on different upstream branch accumulating units, to transport articles accumulated in the upstream accumulating unit to a final accumulating unit so that articles that belong to the same article group are accumulated on different final branch accumulating units, and an article group with smaller designated sequence numbers is accumulated on a downstream side, in a transportation direction, of an article group with larger designated sequence numbers, and to send out articles accumulated in the final accumulating unit from the send-out unit in accordance with the designated sequence numbers.

16 Claims, 7 Drawing Sheets

(56) References Cited

U.S. PATENT DOCUMENTS

2015/0158677 A1* 6/2015 Philipp ............... B65G 47/643
                                                    198/347.1
2018/0022551 A1   1/2018 Gondoh et al.

* cited by examiner

Fig.4

| ARTICLE CODE (G1) | DESIGNATED SEQUENCE NUMBER (G2) | GROUP (G3) | FIRST SORTING SIGN (G41) | SECOND SORTING SIGN (G42) |
|---|---|---|---|---|
| 123001 | 1 | α | A | 1 |
| 123002 | 2 | α | A | 2 |
| 123003 | 3 | α | A | 3 |
| 123004 | 4 | α | A | 4 |
| 124001 | 5 | α | B | 1 |
| 124002 | 6 | α | B | 2 |
| 124003 | 7 | α | B | 3 |
| 124004 | 8 | α | B | 4 |
| 125001 | 9 | α | C | 1 |
| 125002 | 10 | α | C | 2 |
| 125003 | 11 | α | C | 3 |
| 125004 | 12 | α | C | 4 |
| 126001 | 13 | β | A | 1 |
| 126002 | 14 | β | A | 2 |
| 126003 | 15 | β | A | 3 |
| 126004 | 16 | β | A | 4 |
| 127001 | 17 | β | B | 1 |
| 127002 | 18 | β | B | 2 |
| 127003 | 19 | β | B | 3 |
| 127004 | 20 | β | B | 4 |
| 128001 | 21 | β | C | 1 |
| 128002 | 22 | β | C | 2 |
| 128003 | 23 | β | C | 3 |
| 128004 | 24 | β | C | 4 |

(G41 and G42 together form G4)

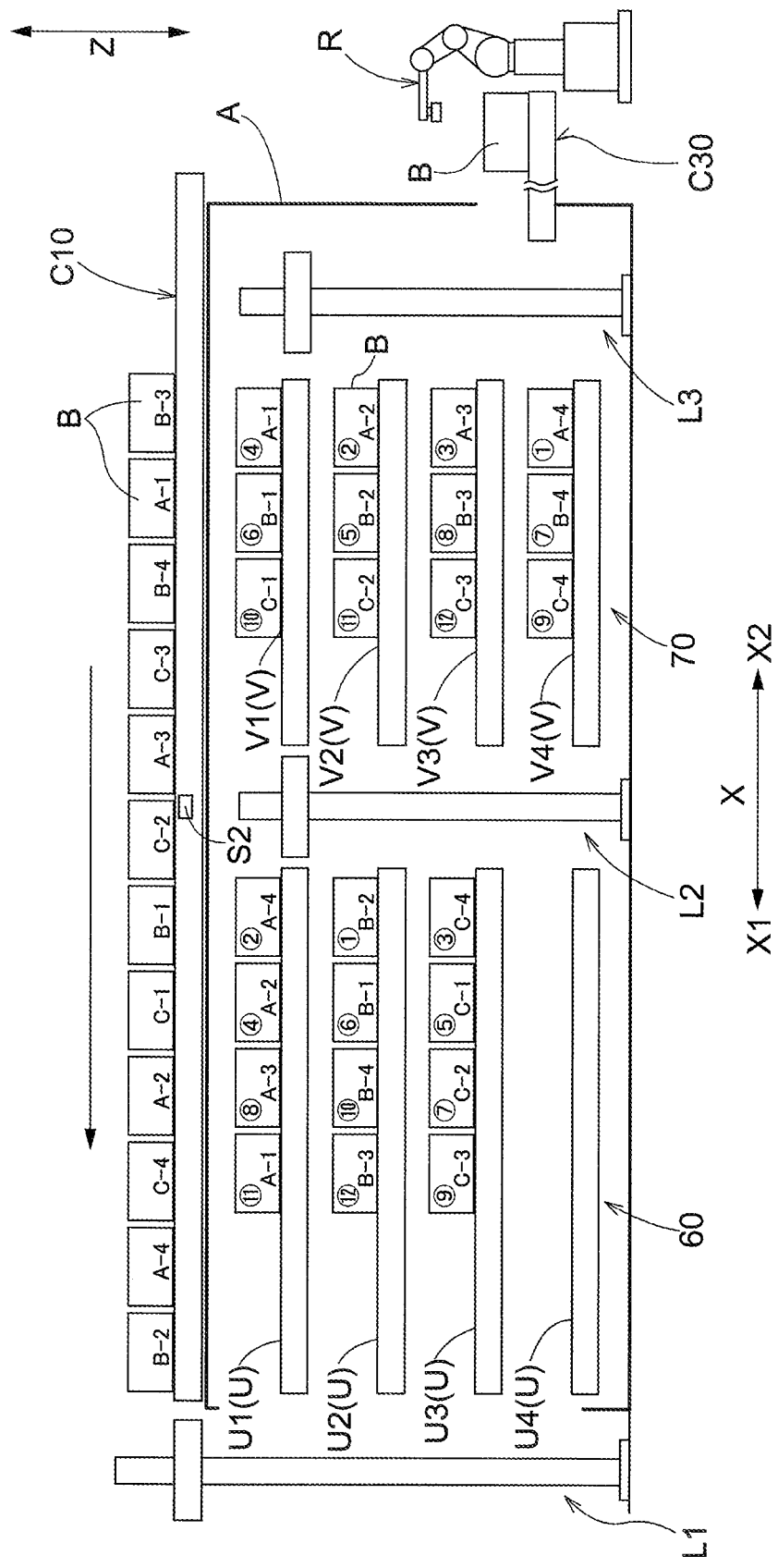

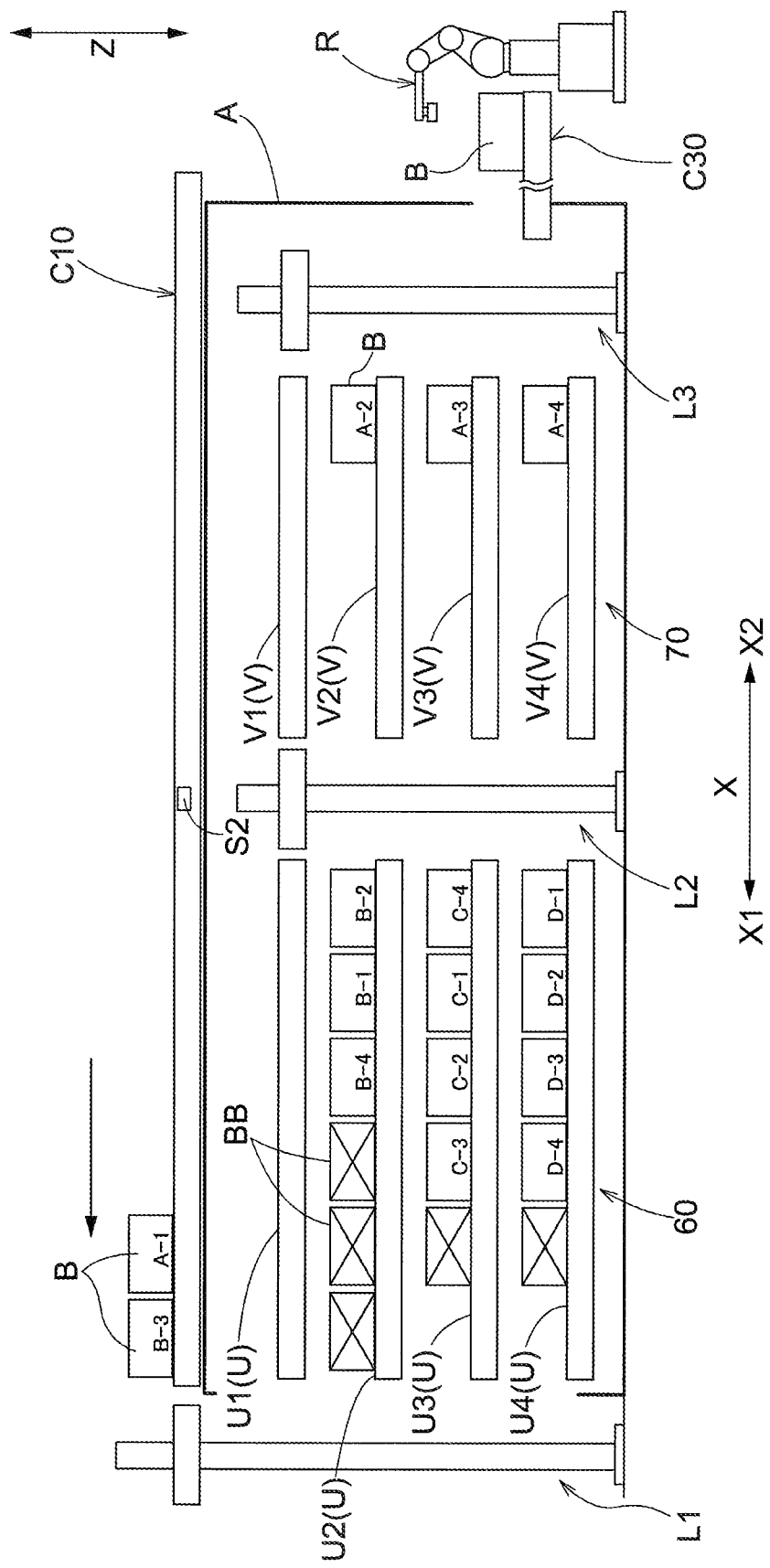

ARTICLE REARRANGING APPARATUS

CROSS-REFERENCE TO RELATED APPLICATION

This application claims priority to Japanese Patent Application No. 2018-003627 filed Jan. 12, 2018, the disclosure of which is hereby incorporated in its entirety by reference.

BACKGROUND OF THE INVENTION

1. Field of the Invention

The present invention relates to an article rearranging apparatus that includes a receiving unit for receiving articles, a send-out unit for sending out articles, a sorting unit for transporting articles received by the receiving unit to the send-out unit and rearranging articles received by the receiving unit, in accordance with designated sequence numbers that have been designated to articles, and a control unit.

2. Description of the Related Art

JP 4-361918A discloses an article rearranging apparatus that is provided with an take-in area serving as a receiving portion for receiving articles and a take-out area serving as a send-out portion for sending out articles, a transport line for transporting articles in a circulating manner via the take-in area and the take-out area, and a storage area that includes 10 buffer lines, which branch from the transport line and merge with another portion of the transport line.

In this article rearranging apparatus, two-digit, serial identification numbers are assigned to respective articles to be transported, in accordance with designated sequence numbers. However, articles for which processing has been finished are first delivered to the transport line regardless of the aforementioned identification number. Thus, there is a possibility that the articles are arranged in a sequence different from the designated sequence numbers when the articles are received in the take-in area.

In this article rearranging apparatus, articles transported along the transport line are subjected to primary sorting to accumulate, in the same buffer line, articles with the same number in the ones place of the identification number. After the primary sorting is complete, subsequently, the articles are reloaded to the transport line in order from a buffer line with a smaller number in the ones place, and secondary sorting is performed to accumulate, in the same buffer line, articles with the same number in the tens place of the identification number.

This article rearranging apparatus can rearrange articles in accordance with designated sequence numbers. However, in this system, articles that have been rearranged in the primary sorting and returned to the transport line are arranged by article group, which is constituted by articles with the same number in the ones place, in the order of the number in the tens place. During the secondary sorting, the articles are distributed to respective buffer lines by article group mentioned above, based on the number in the ones place. For this reason, it takes time for articles with sequential numbers to accumulate in each buffer line, and it also takes time to receive the articles in the take-in area and then send out the articles in the take-out area.

SUMMARY OF THE INVENTION

Therefore, there is a demand for an article rearranging apparatus that can send out articles in the shortest possible time after being received by a receiving unit.

In view of the foregoing situation, an article rearranging apparatus according to an aspect includes: a receiving unit configured to receive articles; a send-out unit configured to send out articles; a sorting unit configured to transport articles received by the receiving unit to the send-out unit, and rearrange the articles received by the receiving unit in accordance with designated sequence numbers; and a control unit, wherein the sorting unit includes a plurality of accumulation-transport units capable of accumulating and transporting a plurality of articles, the accumulation-transport units being arranged in a transportation direction that is a direction extending from the receiving unit toward the send-out unit, of the plurality of accumulation-transport units, an accumulation-transport unit arranged furthest on a downstream side in the transportation direction is a final accumulating unit, and an accumulation-transport unit arranged adjacent, on an upstream side, to the final accumulating unit is an upstream accumulating unit, each of the final accumulating unit and the upstream accumulating unit includes a plurality of branch accumulating units that are separate from each other in parallel in the transportation direction, the upstream accumulating unit includes a first set number of upstream branch accumulating units serving as the branch accumulating units, the final accumulating unit includes a second set number of final branch accumulating units serving as the branch accumulating units, and the first set number and the second set number are the same number or different numbers, the receiving unit receives groups of articles, group-by-group, wherein a sequence in each group differs from the designated sequence numbers, each of the plurality of upstream branch accumulating units can accumulate articles, the number of which is the second set number or more, in a state of being arranged in a line in the transportation direction, each of the plurality of final branch accumulating units can accumulate articles, the number of which is the first set number or more, in a state of being arranged in a line in the transportation direction, the number of articles in each of the groups is smaller than or equal to a number obtained by multiplying the first set number by the second set number, as for articles of the groups, articles are grouped into article groups according to the designated sequence numbers that increase in ascending order, each article group including the second set number of articles, and the control unit controls the sorting unit and the send-out unit to transport articles received by the receiving unit to the upstream accumulating unit so that articles that belong to the same article group are accumulated on the same upstream branch accumulating unit, and articles that belong to different article groups are accumulated on different upstream branch accumulating units, to transport articles accumulated in the upstream accumulating unit to the final accumulating unit so that articles that belong to the same article group are accumulated on different final branch accumulating units, and articles of a group for which the designated sequence numbers are smaller are accumulated on the downstream side, in the transportation direction, of articles of a group for which the designated sequence numbers are larger, and to send out articles accumulated in the final accumulating unit from the send-out unit in accordance with the designated sequence numbers.

With this configuration, articles that have been received by the receiving unit and belong to one group are transported to the first set number of upstream branch accumulating units. At this time, articles that belong to the same article group are accumulated on the same upstream branch accumulating unit, and articles that belong to different article groups are accumulated on different upstream branch accumulating units. By thus accumulating articles that belong to one group in the first set number of upstream branch accumulating units, when these articles are transported to the second set number of final branch accumulating units, the articles can be transported so that articles that belong to the same article group are accumulated on different final branch accumulating units, and a group of articles with smaller designated sequence numbers is accumulated on the downstream side, in the transportation direction, of a group of articles with larger designated sequence numbers. Furthermore, by thus accumulating articles that belong to one group in the second set number of final branch accumulating units, these articles can be sent out from the send-out unit in accordance with the designated sequence numbers.

Accordingly, even if articles received by the receiving unit are not arranged in accordance with the designated sequence number, the articles can be rearranged in a predetermined sequence by the sorting unit. As a result, an article rearranging apparatus can be provided that can send out articles in the shortest possible time after being received by the receiving unit.

BRIEF DESCRIPTION OF THE DRAWINGS

FIG. 4 shows designated sequence numbers, groups, and sorting signs of articles.

FIG. 6 illustrates article rearranging processing performed by the sorting unit.

FIG. 7 illustrates the case where the number of articles in primary sorting conveyors exceeds the number of accumulatable articles.

DETAILED DESCRIPTION OF PREFERRED EMBODIMENTS

An embodiment in which an article rearranging apparatus is applied to an article storage facility will be described based on the drawings. The article storage facility according to this embodiment is configured as a stock distribution center for preparing and shipping the necessary amount of goods of necessary types to a plurality of different shipping destinations, the goods being supported by a plurality of types of articles (e.g. corrugated fiberboard packages, pallets etc.) delivered from manufacturers or the like.

Figure 1:
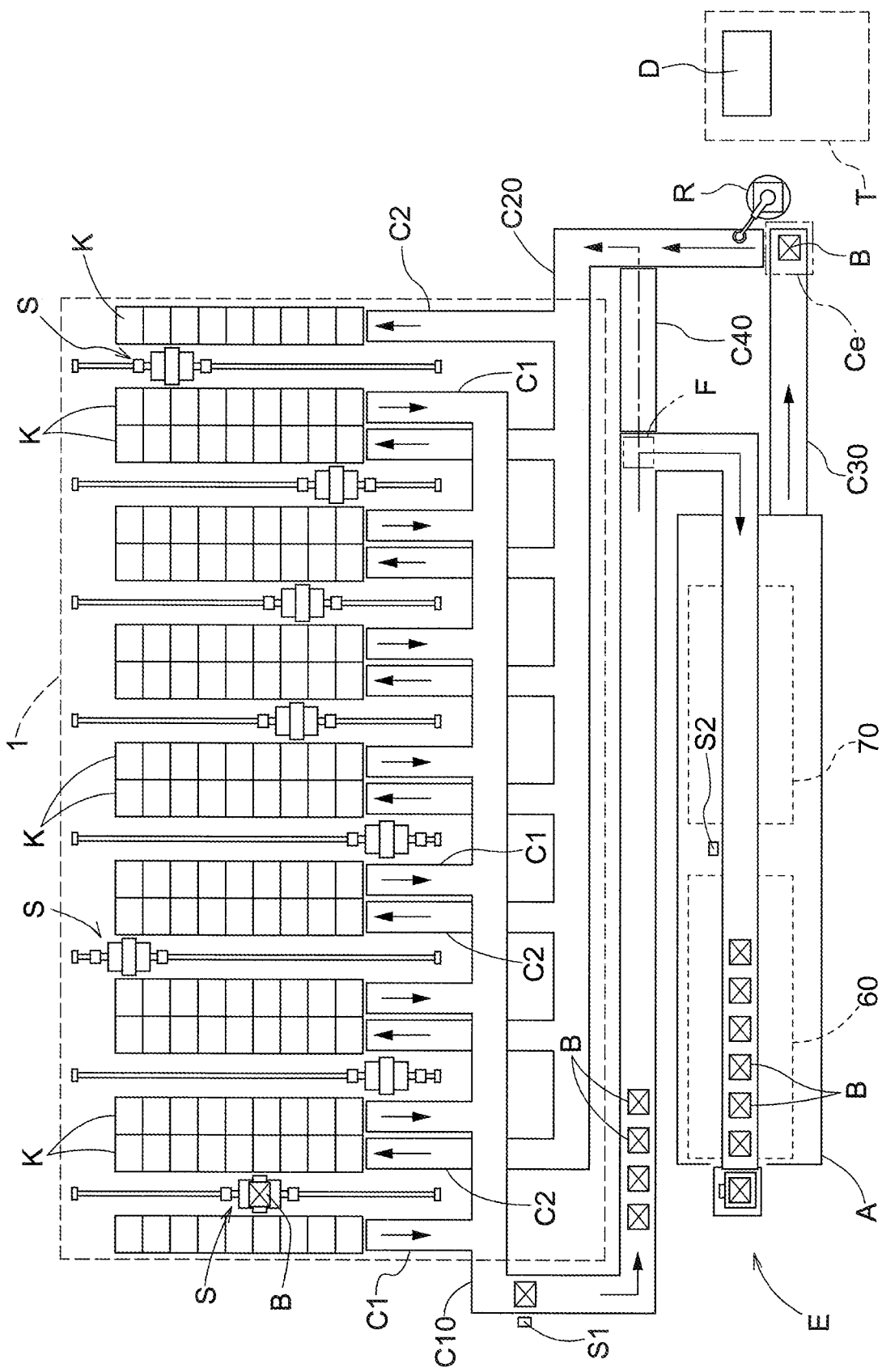
FIG. 1 is a schematic plan view of an article storage facility that includes an article rearranging apparatus.

In the article storage facility according to this embodiment, articles B are stored in a storage warehouse 1 shown in FIG. 1. As shown in FIG. 1, the storage warehouse 1 is provided with a plurality of article storage shelves K, in which a plurality of storage units for accommodating the articles B are arranged in the up-down direction and the lateral direction. A plurality of stacker cranes S are also provided for transporting the articles B between the aforementioned article storage shelves and unloading conveyors C1. At downstream end portions of a plurality of unloading conveyors C1, an upstream transport conveyor C10 (transport conveyor) is provided for transporting, toward the downstream side, articles B received from the unloading conveyors C1. Each of the unloading conveyors C1 and the upstream transport conveyor C10 transports articles B in a state of being arranged in a line along a transport path.

The upstream transport conveyor C10 transports, toward the downstream side, articles B received from the unloading conveyors C1 while arranging the articles B in the transportation direction and maintaining the transporting sequence of the articles. Note that the plurality of unloading conveyors C1 merge with the upstream transport conveyor C10 at a plurality of positions that are spaced apart in a transportation direction X of the upstream transport conveyor C10. Accordingly, an article B that an unloading conveyor C1 located on the downstream side, of the plurality of unloading conveyors C1, has delivered to the upstream transport conveyor C10 is likely to be transported earlier on the upstream transport conveyor C10. For example, even if an unloading conveyor C1 located relatively upstream, of the plurality of unloading conveyors C1, has delivered an article B earlier to the upstream transport conveyor C10 than an unloading conveyor C1 located relatively downstream, the article B that the unloading conveyor C1 located relatively downstream delivered to the upstream transport conveyor C10 is transported earlier in some cases. Note that the upstream transport conveyor C10 only transports articles B in the order of reception, and does not have a function of rearranging the articles B that are being transported.

The articles B unloaded from the storage warehouse 1 are transported to an end portion Ce of a send-out conveyor C30, which is installed on the downstream side of the upstream transport conveyor C10. Specifically, the upstream transport conveyor C10 transports the articles B to a sorting unit A, and the send-out conveyor C30 transports the articles B that have been sent out from the sorting unit A, to the end portion Ce of the send-out conveyor. Then, a picking robot R picks the necessary number of goods from an article B located at the end portion Ce, and puts the picked goods into a collection case D, which is waiting at a loading position T, for example. Although not shown in the diagram, the collection case D is a container that is supported by a self-running truck, a cage cart that is placed on a transport belt, or the like.

When goods are put in the collection case D by the picking robot R, the sequence in which the goods are to be put in needs to be considered in some cases. For example, in the case of putting heavy goods, such as plastic bottles of water, as well as boxes of medicine into the same collection case D, if the boxes of medicine are put in first and then the plastic bottles are put in, there is a concern that the boxes of medicine will be crushed by the plastic bottles. Also, there are cases where the efficiency of storing goods in the collection case D differs depending on the order in which the goods are put into the collection case D. In the case where the sequence of putting goods into the collection case D needs to be considered in relation to the weight, stability, or the like, or in order to increase storage efficiency, as in the aforementioned cases, if the sequence of articles B transported by the upstream transport conveyor C10 is not appropriate, the sequence in which the articles B arrive at the end portion Ce of the send-out conveyor C30 needs to be adjusted to an appropriate sequence. In this embodiment, an article rearranging apparatus E is used to rearrange, in an appropriate sequence, the articles B arriving at the end portion Ce of the send-out conveyor C30 in the aforementioned cases.

Figure 2:
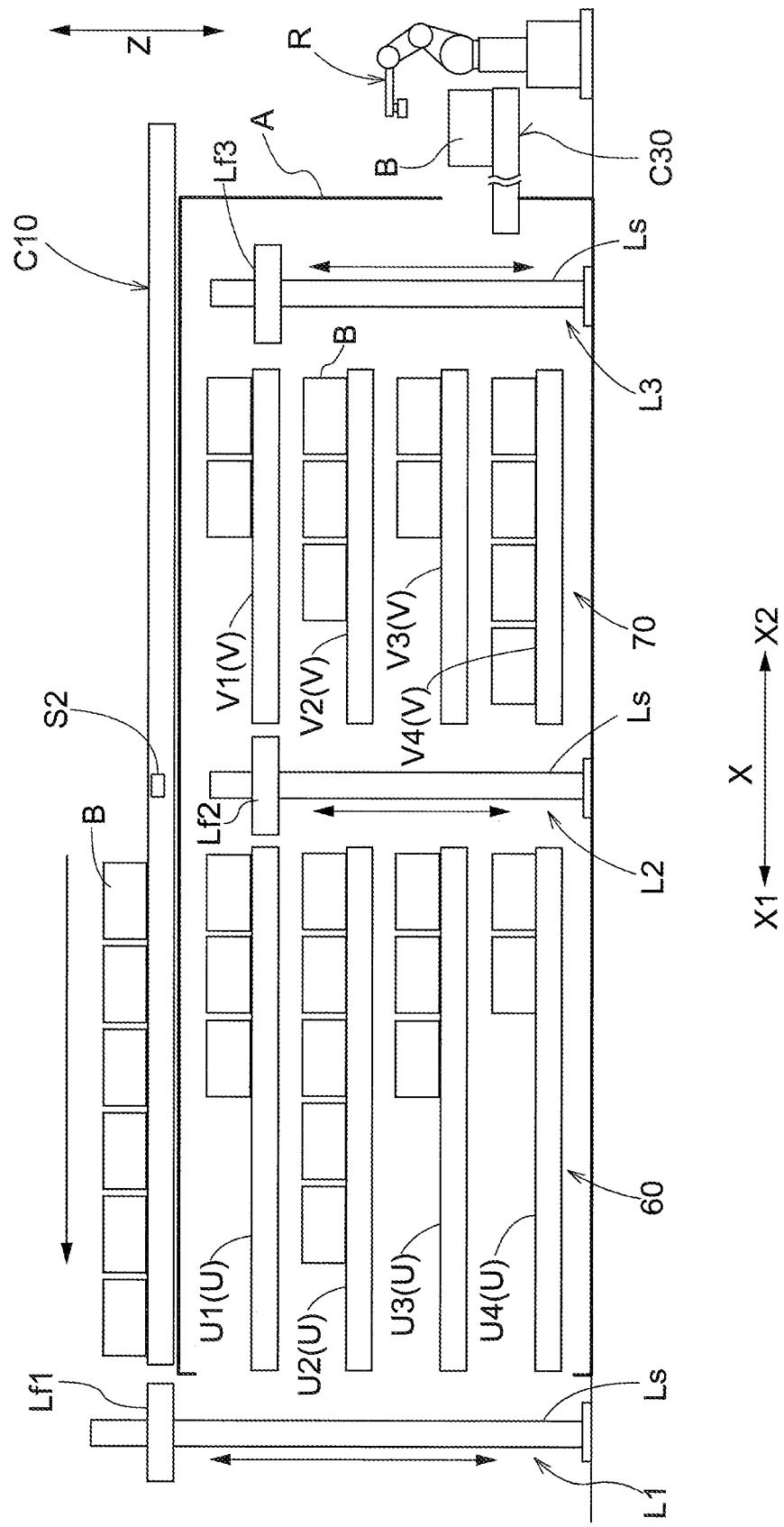
FIG. 2 is a side view of a sorting unit.

As shown in FIGS. 1 and 2, the article rearranging apparatus E includes an upstream lifter L1 serving as a receiving unit for receiving articles B, the send-out conveyor C30 serving as a send-out unit for sending out articles B, the upstream transport conveyor C10 serving as a transport conveyor for transporting articles B taken out from the article storage shelves K to the upstream lifter L1, and the sorting unit A for rearranging articles B received from the upstream lifter L1 in accordance with designated sequence numbers G2. As shown in FIG. 2, the sorting unit A includes an upstream accumulating unit 60 (accumulation-transport unit), an intermediate lifter L2, a downstream accumulating unit 70 (accumulation-transport unit), and a downstream lifter L3.

The upstream accumulating unit 60 includes a plurality of primary sorting conveyors U. In this embodiment, the upstream accumulating unit 60 has four primary sorting conveyors U, which are a first primary sorting conveyor U1 to a fourth primary sorting conveyor U4. The downstream accumulating unit 70 includes a plurality of secondary sorting conveyors V. In this embodiment, the downstream accumulating unit 70 has four secondary sorting conveyors V, which are a first secondary sorting conveyor V1 to a fourth secondary sorting conveyor V4. The upstream lifter L1 transports the articles B to deliver each of the articles B received from the upstream transport conveyor C10 to one of the four primary sorting conveyors U. The intermediate lifter L2 transports articles B to deliver each of the articles B received from the four primary sorting conveyors U to one of the four secondary sorting conveyors V. The downstream lifter L3 transports articles B to deliver articles B received from the four secondary sorting conveyors V to the send-out conveyor C30.

In this embodiment, the upstream lifter L1, the upstream accumulating unit 60, the intermediate lifter L2, the downstream accumulating unit 70, the downstream lifter L3, and the send-out conveyor C30 are arranged in this order from an upstream side X1 toward a downstream side X2 in the transportation direction X, in a straight line when viewed in a plan view. Note that, as shown in FIG. 2, in the article rearranging apparatus E, the direction in which the primary sorting conveyors C and the secondary sorting conveyors V transport articles B (i.e. the direction extending from the upstream lifter L1 toward the send-out conveyor C30 in the sorting unit A) is the transportation direction X. The upstream side in the transportation direction X is the upstream side X1, and the downstream side in the transportation direction X is the downstream side X2.

The upstream lifter L1 includes a column Ls, and a lifting transport unit Lf1 capable of moving in the up-down direction Z while being guided by the column Ls. The four primary sorting conveyors U are provided at positions adjacent, on the downstream side X2, to the upstream lifter L1, and articles B can be delivered from the lifting transport unit Lf1 of the upstream lifter L1 to end portions, on the upstream side X1, of the four primary sorting conveyors U. These four primary sorting conveyors U overlap each other when viewed in the up-down direction Z. An end portion, on the downstream side, of the upstream transport conveyor is also provided at a position overlapping the primary sorting conveyors U when viewed in the up-down direction Z. As a resulting of the lifting transport unit Lf1 moving up and down, the upstream lifter L1 can deliver each of the articles B received from the upstream transport conveyor C10 to any one of the first primary sorting conveyor U1 to the fourth primary sorting conveyor U4.

The intermediate lifter L2 includes a column Ls and a lifting transport unit Lf2, similarly to the upstream lifter L1. The four primary sorting conveyors U are provided at positions adjacent, on the upstream side X1, to the intermediate lifter L2. Thus, articles B can be delivered to the lifting transport unit Lf2 of the intermediate lifter L2 from the end portions, on the downstream side X2, of the four primary sorting conveyors U. The four secondary sorting conveyors V are provided at positions adjacent, on the downstream side X2, to the intermediate lifter L2. Thus, articles B can be delivered from the lifting transport unit Lf2 of the intermediate lifter L2 to end portions, on the upstream side X1, of the four secondary sorting conveyors V. These four secondary sorting conveyors V are provided in a state of overlapping each other when viewed in the up-down direction Z. As a result of the lifting transport unit Lf2 moving up and down, the intermediate lifter L2 can deliver each of the articles B received from any one of the four primary sorting conveyors U to any one of the four secondary sorting conveyors V.

The downstream lifter L3 includes a column Ls and a lifting transport unit Lf3, similarly to the upstream lifter L1 and the intermediate lifter L2. The four secondary sorting conveyors V are provided at positions adjacent, on the upstream side X1, to the downstream lifter L3. Thus, articles B can be delivered to the lifting transport unit Lf3 of the downstream lifter L3 from end portions, on the downstream side X2, of the four secondary sorting conveyors V. As a result of the lifting transport unit Lf3 moving up and down, the downstream lifter L3 can deliver each of the articles B received from any one of the four secondary sorting conveyors V to the send-out conveyor C30. Note that the downstream lifter L3 receives articles B from the first secondary sorting conveyor V1, the second secondary sorting conveyor V2, the third secondary sorting conveyor V3, and the fourth secondary sorting conveyor V4 in this order, and delivers the received articles B to the send-out conveyor C30. After articles B from the fourth secondary sorting conveyor V4 have been delivered, the articles B from the first secondary sorting conveyor V1 are again delivered, and thus delivered in a round-robin system.

The end portion Ce, on the downstream side, of the send-out conveyor C30 can hold an article B in a stopped state, and the picking robot R takes out goods from the article B held at the end portion Ce, on the downstream side, of the send-out conveyor C30. The article B from which the goods were taken out is returned to the storage warehouse 1 via a returning conveyor C20 and a loading conveyor C2 (see FIG. 1).

Figure 3:
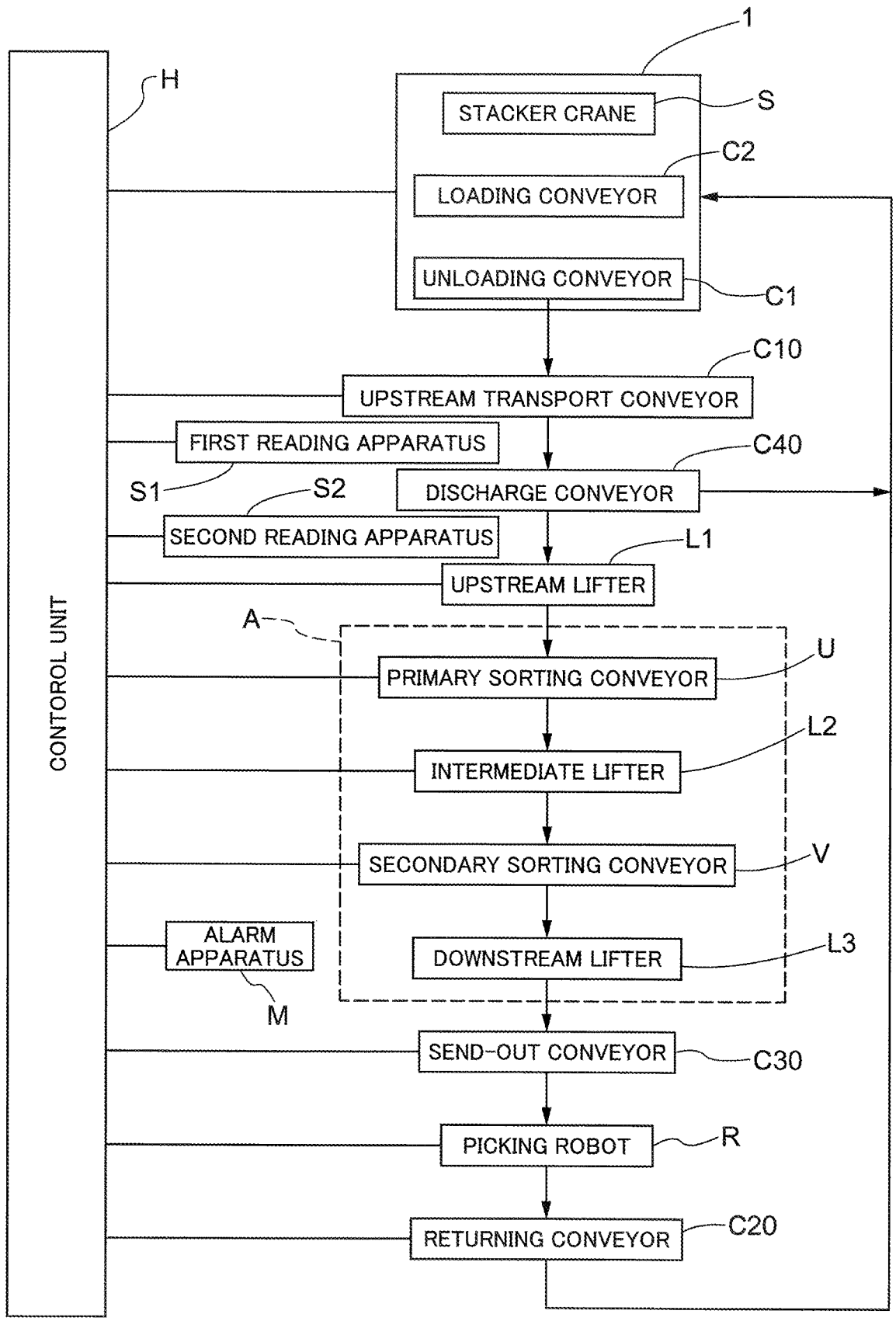
FIG. 3 is a control block diagram of the article storage facility.

Accordingly, in the article storage facility according to this embodiment, articles B are transported as indicated by solid-line arrows in FIG. 3.

Note that a camera for image recognition is attached above the picking robot R or to a picking hand unit of the picking robot R, and whether or not goods are present in an article B subjected to picking can be checked. If, as a result of the picking robot R taking out goods, no goods are present in this article B, this article B (hereinafter, "empty box") is transported to an empty box line. As for this configuration, for example, an automated transport carriage may be used, or a configuration may also be employed in which the empty box line connects the end portion Ce, on the downstream side, of the send-out conveyor C30 to an empty box collecting area.

The upstream accumulating unit 60 includes a first set number of primary sorting conveyors U, which are separate from each other in parallel in the transportation direction X. In this embodiment, the upstream accumulating unit 60 includes four primary sorting conveyors U, and the first set number is 4. The downstream accumulating unit 70 includes a second set number of secondary sorting conveyors V, which are separate from each other in parallel in the transportation direction X. In this embodiment, the downstream accumulating unit 70 includes four secondary sorting conveyors V, and the second set number is 4. Thus, in this embodiment, the first set number, which is the number of primary sorting conveyors U included in the upstream accumulating unit 60, and the second set number, which is the number of secondary sorting conveyors V included in the downstream accumulating unit 70, are the same number. Note that "being separate from each other in parallel in the transportation direction X" indicates that, as for the upstream accumulating unit 60, the articles B received from the upstream lifter L1 are transported to be distributed to the plurality of primary sorting conveyors U, and the articles B transported to be distributed are parallel to each other in the up-down direction Z.

Each of the four primary sorting conveyors U can accumulate the second set number or more of articles B in a state of being arranged in a line in the transportation direction X on the primary sorting conveyor U. In this embodiment, each of the four primary sorting conveyors U can accumulate six articles B in a state of being arranged in a line in the transportation direction X on the primary sorting conveyor U. Accordingly, the upstream accumulating unit 60 can accumulate 24 articles B.

Each of the four secondary sorting conveyors V can accumulate the first set number or more of articles B in a state of being arranged in a line in the transportation direction X on the secondary sorting conveyor U. In this embodiment, each of the four secondary sorting conveyors V can accumulate four articles B in a state of being arranged in a line in the transportation direction X on the secondary sorting conveyor V. Accordingly, the downstream accumulating unit 70 can accumulate 16 articles B.

Thus, the number of articles B that can be accumulated on each primary sorting conveyor U is greater than the number of articles B that can be accumulated on each secondary sorting conveyor V. Each of the upstream accumulating unit 60 and the downstream accumulating unit 70 can accumulate at least a number of articles B that is obtained by multiplying the first set number by the second set number. Note that each primary sorting conveyor U corresponds to an upstream branch accumulating unit (branch accumulating unit), and each secondary sorting conveyor V corresponds to a final branch accumulating unit (branch accumulating unit).

As described above, the sorting unit A includes a plurality of accumulation-transport units, which are the upstream accumulating unit 60 and the downstream accumulating unit 70, and the plurality of accumulation-transport units are installed in a state of being arranged in a line in the transportation direction X from the upstream lifter L1 toward the send-out conveyor C30. The downstream accumulating unit 70 corresponds to a final accumulating unit, of the plurality of accumulation-transport units, that is arranged furthest on the downstream side X2 in the transportation direction X. The upstream accumulating unit 60 is an accumulation-transport unit, of the plurality of accumulation-transport units, that is arranged adjacent, on the upstream side X1, to the final accumulation-transport unit.

As shown in FIG. 1, the article rearranging apparatus E includes a first reading apparatus S1 and a second reading apparatus S2. The first reading apparatus S1 and the second reading apparatus S2 read article information, which is assigned to each article B that is transported by the upstream transport conveyor C10. In this embodiment, a code for identifying each article B, which is in the form of a barcode, is printed on or attached to each article B, and the first reading apparatus S1 and the second reading apparatus S2 are constituted by barcode readers for reading the barcode provided on each article B. The first reading apparatus S1 is installed on the upstream side, in the transportation direction (the direction in which articles B are transported by the upstream transport conveyor C10), of the second reading apparatus S2, and reads the article information regarding the articles B on the upstream side of the second reading apparatus S2. That is to say, the article information regarding the articles B transported by the upstream transport conveyor C10 is read by the first reading apparatus S1, and is then read by the second reading apparatus S2.

The article rearranging apparatus E also includes a discharge apparatus F. The discharge apparatus F is installed between the first reading apparatus S1 and the second discharge apparatus S2 in the transportation direction of the upstream transport conveyor C10. This discharge apparatus F is constituted by a portion of the upstream transport conveyor C10, and can be switched between a state of transporting articles B as-is toward the downstream side of the upstream transport conveyor C10, and a state of transporting an article B to deliver articles B from the upstream transport conveyor C10 to a discharge conveyor C40. That is to say, a portion of the upstream transport conveyor C10 functions as the discharge apparatus F, and can discharge articles B from the upstream transport conveyor C10 and deliver the discharged articles B to the discharge conveyor C40. The discharge apparatus F discharges articles B whose article information has not been read by the first reading apparatus S1, from the upstream transport conveyor C10.

Next, a control configuration of the article storage facility according to this embodiment will be described based on FIG. 3. The control unit H is constituted by a computer that includes a computing device and a storage device, for example, and performs various kinds of control by executing programs stored in the storage device.

The storage warehouse 1 is provided with a plurality of stacker cranes S, a plurality of unloading conveyors C1 for receiving articles B from the stacker crane S and delivering the articles B to the upstream transport conveyor C10, and a plurality of loading conveyors C2 for transporting articles B received from the returning conveyor C20 to positions at which the articles B are delivered to the stacker cranes S. The control unit H is communicably connected to the storage warehouse 1.

The control unit H is also communicably connected to the upstream transport conveyor C10, the send-out conveyor C30, the returning conveyor C20, the four primary sorting conveyors U, the four secondary sorting conveyors V, the upstream lifter L1, the intermediate lifter L2, and the downstream lifter L3. Accordingly, the upstream transport conveyor C10, the send-out conveyor C30, the returning conveyor C20, the four primary sorting conveyors U, the four secondary sorting conveyors V, the upstream lifter L1, the intermediate lifter L2, and the downstream lifter L3 are controlled by the control unit H.

Also, regarding articles B unloaded from the storage warehouse 1, the control unit H stores, in a storage device such as a memory or a register, article codes G1 for identifying the articles B (which correspond to the article information, and are product identification codes such as JAN codes (Japanese Article Number Codes) or EAN codes (European Article Number Codes)), designated sequence numbers G2, in accordance with which the articles B are brought to the end portion Ce, on the downstream side, of the send-out conveyor C30 (i.e. the sequence in which the picking robot R is to pick goods), groups G3 to which the articles B belong, and later-described sorting signs G4, as shown in the table in FIG. 4. Information (here, the article codes G1) regarding articles B to be brought to the end portion Ce, on the downstream side, of the send-out conveyor C30, as well as the designated sequence numbers G2 of the articles, is input to the control unit H from a superordinate controller (not shown). These pieces of information correspond to information (take-out information) regarding articles B that have been discharged from the article storage shelves K. Based on the designated sequence numbers G2 of articles B, the control unit H sets groups G3 (e.g. α and β) to which a third set number or less of articles B belong, and the sorting signs G4 (e.g. A to D and 1 to 4) of the articles that belong to the respective groups G3 (the third set number will be described later). The control unit H then stores the article codes G1, the designated sequence numbers G2, the groups G3, and the sorting signs G4 in the storage device.

Thus, for an article B to be brought to the end portion Ce, on the downstream side, of the send-out conveyor C30, the control unit H sets and manages the groups G3, to each of which the preset third set number or less of articles B belong, from articles B with smaller designated sequence numbers G2. The number of articles belonging to each group G3 is smaller than or equal to a number obtained by multiplying the first set number by the second set number. In this embodiment, the number of articles that belong to each group G3 is set to 12, which is a number smaller than or equal to 16, i.e. the number obtained by multiplying the first set number, which is 4, by the second set number, which is 4. That is to say, in this embodiment, the control unit H forms the groups G3 in units of 12 articles B in the ascending order of the designated sequence numbers G2, of the articles B to be brought to the end portion Ce, on the downstream side, of the send-out conveyor C30.

The control unit H transmits, to the storage warehouse 1, information regarding the articles B to be brought to the end portion Ce, on the downstream side, of the send-out conveyor C30, and information regarding the groups G (e.g. information shown in the table in FIG. 4). The storage warehouse 1 unloads articles B so that a plurality of articles B that belong to the same group G3 are transported in a continuous sequence at a certain point (e.g. the point where the first reading apparatus S1 is installed) on the upstream transport conveyor C10.

Figure 5:
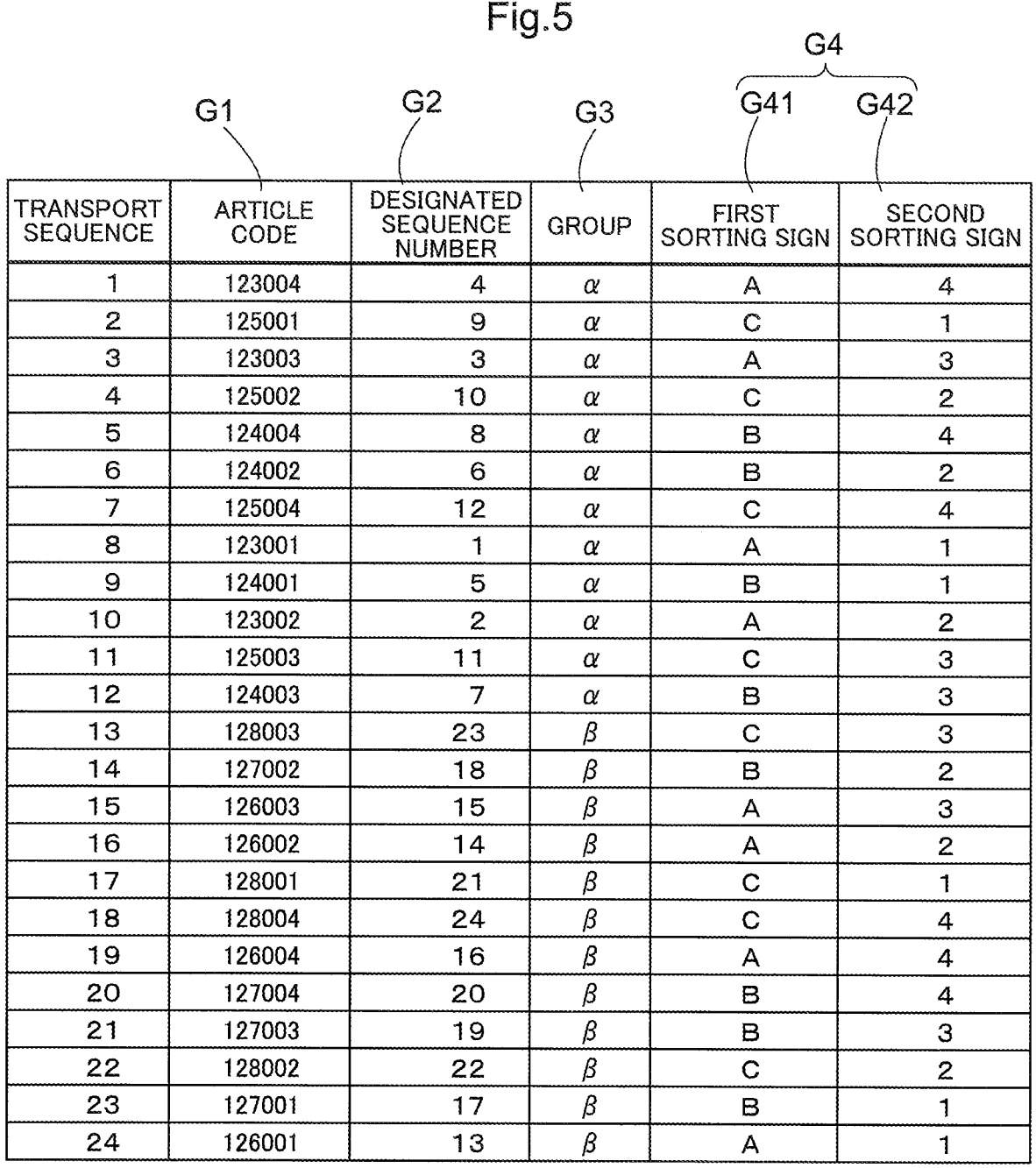
FIG. 5 shows a transport sequence in which articles are transported by an upstream transport conveyor.

Meanwhile, as for the transporting sequence of the articles B in each group G3, the articles B are not necessarily transported in accordance with the designated sequence numbers G2. For example, as shown as an example in the table in FIG. 5, there are cases where the article B whose designated sequence number G2 is 4 (the first sorting sign G41 of this article B is A, and second sorting sign G42 is 4; hereinafter, each sorting sign G4 will be abbreviated as A-4, for example, in some cases) is transported first, the article B whose designated sequence number G2 is 9 (the sorting sign G4 of this article B is C-1) is transported next, and thereafter as well, articles B are transported regardless of their designated sequence numbers G2. For this reason, there are cases where the upstream lifter L1 receives articles B in a sequence different from the designated sequence numbers G2. That is to say, the upstream lifter L1 functions as a receiving unit for receiving articles B by groups G3, in a sequence different from the designated sequence numbers G2 within the group G3. In other words, the upstream lifter L1 functions as a receiving unit for receiving articles B by groups G3 even in a sequence different from the designated sequence numbers G2 within the group G3 (i.e. regardless of whether or not the sequence in the group G3 coincides with the designated sequence numbers G2). The control unit H performs processing to cause the article rearranging apparatus E to rearrange articles B unloaded from the storage warehouse 1 in accordance with the designated sequence numbers G2, based on the aforementioned sorting signs G4.

The control unit H acquires the take-out information, which is information regarding articles B that have been taken out from the article storage shelves K, when the articles B are taken out from the article storage shelves K. Accordingly, the control unit H can set the designated sequence numbers G2 based on the take-out information before the article information regarding the articles B is read by the second reading apparatus S2. In this embodiment, before the article information regarding the article B arranged furthest on the upstream side of the upstream transport conveyor C10, of the plurality of articles B that belong to one group G3, is read by the second reading apparatus S2 (i.e. before the article information regarding all of the taken-out articles B is read by the second reading apparatus S2), the control unit H sets the designated sequence numbers G2 of the plurality of articles B that belong to this group G3, based on the take-out information.

As for an article B whose article information has not been read by the first reading apparatus S1, the control unit H controls the upstream transport conveyor C10 to cause the discharge apparatus F to discharge the article B from the upstream transport conveyor C10. This article B discharged from the upstream transport conveyor C10 is delivered to the discharge conveyor C40, is then transported by the discharge conveyor C40, the returning conveyor C20, and the loading conveyor C2 in this order, and is returned to an article storage shelf K. As for an article B whose article information has been read by the first reading apparatus S1, the control unit H controls the upstream transport conveyor C10 so as not to cause the discharge apparatus F to discharge the article B from the upstream transport conveyor C10. The article B that was not discharged from the upstream transport conveyor C10 is continuously transported by the upstream transport conveyor C10, and is delivered from the upstream transport conveyor C10 to the upstream lifter L1.

As for an article B whose article information has also been read by the second reading apparatus S2, the control unit H controls operations of the sorting unit A and the send-out conveyor C30 to send out the article B in accordance with the designated sequence number G2 from the send-out conveyor C30, based on the article information read by the second reading apparatus S2. As for an article B whose article information has been read by the first reading apparatus S1 but has not been read by the second reading apparatus S2, the control unit H controls operations of the sorting unit A and the send-out conveyor C30 to send out the article B in accordance with the designated sequence number G2 from the send-out conveyor C30, based on the article information read by the first reading apparatus S1.

The rearranging processing will be described below with reference also to FIG. 6. As shown as an example in the table in FIG. 5, in FIG. 6 as well, articles B are transported on the upstream transport conveyor C10 regardless of the designated sequence numbers. Note that the transporting sequence differs between the mode shown in the example in FIG. 5 and the mode shown in the example in FIG. 6. Note that each sorting sign G4 is a combination of two signs, namely a first sorting sign G41 and a second sorting sign G42, as mentioned above with reference to FIG. 5. Note that, in FIG. 6, the articles B that are being transported by the upstream transport conveyor C10, the articles B accumulated in the upstream accumulating unit 60, and the articles B accumulated in the downstream accumulating unit 70 are the same articles B. That is to say, the articles B accumulated in the upstream accumulating unit 60 and the downstream accumulating unit 70 indicate a state where the articles B transported by the upstream transport conveyor C10 have accumulated. Each article B in FIG. 6 is provided with a first sorting sign G41 and a second sorting sign G42 that are assigned thereto.

As illustrated in the table in FIG. 4, regarding articles B that are assigned the respective designated sequence numbers G2, the control unit H sets each second set number of articles B with smaller designated sequence numbers B (prior articles B) as articles B that belong to the same article group, and assigns the same first sorting sign G41 (article group identification information) to the articles B that belong to the same article group. Here, since the second set number is 4, the articles B whose designated sequence numbers G2 are 1 to 4 are assigned A as the first sorting sign G41. Then, the articles B whose designated sequence numbers G2 are 5 to 8 are assigned B, and the articles B whose designated sequence numbers G2 are 9 to 12 are assigned C, as the respective first sorting signs G41.

The control unit H then assigns a second sorting sign G42 (sequence number identification information), which indicates a set distribution sequence number, to each of the articles B with the same first sorting sign G41, in the ascending order of the designated sequence number G2. Here, since the article group for which the first sorting sign G41 is A includes the articles B whose designated sequence numbers G2 are 1 to 4, the article B whose designated sequence number G2 is 1 is assigned 1 as the second sorting sign G42. Then, the article B whose designated sequence number G2 is 2 is assigned 2, the article B whose designated sequence number G2 is 3 is assigned 3, and the article B whose designated sequence number G2 is 4 is assigned 4, as the respective second sorting signs G42. Similarly, the article group for which the first sorting sign G41 is B includes the articles B whose designated sequence numbers G2 are 5 to 8, the article B whose designated sequence number G2 is smallest, i.e. is 5, is assigned 1 as the second sorting sign G42. Then, the article B whose designated sequence number G2 is 6 is assigned 2, the article B whose designated sequence number G2 is 7 is assigned 3, and the article B whose designated sequence number G2 is 8 is assigned 4, as the respective second sorting signs G42. The same applies to the article group for which the first sorting sign G41 is C.

Note that the set distribution sequence numbers refer to sequence numbers in accordance with which the intermediate lifter L2 distributes articles B with the same first sorting sign G41 accumulated on each primary sorting conveyor U in the upstream accumulating unit 60 to respective secondary sorting conveyors V in the downstream accumulating unit 70. In this embodiment, the set distribution sequence numbers are set for the first secondary sorting conveyor V1, the second secondary sorting conveyor V2, the third secondary sorting conveyor V3, and the fourth secondary sorting conveyor V4 in this order.

In the case of distributing a plurality of articles B that have been received from the upstream lifter L1 and belong to one group G3, to the plurality of primary sorting conveyors U to accumulate the articles B thereon, the control unit H controls operations of the upstream lifter L1 and the primary sorting conveyors U so that the upstream lifter L1 transports the received articles B to the upstream accumulating unit 60 to accumulate articles B with the same first sorting sign G41 (i.e. articles B that belong to the same article group) on the same primary sorting conveyor U, and to accumulate articles B with different first sorting signs G41 (i.e. articles B that belong to different article groups) on different primary sorting conveyors U. As a result, in the upstream accumulating unit 60, articles B are accumulated on the primary sorting conveyors U based on the first sorting signs G41 (A, B, and C), as shown in FIG. 6.

Here, an example of a mode is illustrated in which articles of a group for which the first sorting sign G41 is A are accumulated on the first primary sorting conveyor U1, articles of a group for which the first sorting sign G41 is B are accumulated on the second primary sorting conveyor U2, and articles of a group for which the first sorting sign G41 is C are accumulated on the third primary sorting conveyor U3. The number of article groups is 3, which is smaller than the first set number that is 4, and no article B is accumulated on the fourth primary sorting conveyor C4. Note that numbers surrounded by circles in the upstream accumulating unit 60 in FIG. 6 indicate the transport sequence when articles B are accumulated on the primary sorting conveyors U. This transport sequence is the same as the transport sequence on the upstream transport conveyor C10.

Next, in the case of transporting the plurality of articles B accumulated in the upstream accumulating unit 60 (the plurality of primary sorting conveyors U) to the downstream accumulating unit 70 (the plurality of secondary sorting conveyors V), the control unit H controls operations of the primary sorting conveyors U, the intermediate lifter L2, and the secondary sorting conveyors V to accumulate articles B with the same first sorting sign G41 (the same article group) on different secondary sorting conveyors V, and accumulate an article B with a smaller designated sequence number G2 with the first sorting sign G41, on the downstream side X2 of an article B with a larger designated sequence number G2 with the first sorting sign G41.

Here, the article group for which the first sorting sign G41 is A includes the article B with the smallest designated sequence number G2, and the article group for which the first sorting sign G41 is C includes the article B with the largest designated sequence number G2. Accordingly, articles B are delivered to the downstream accumulating unit 70 (the plurality of secondary sorting conveyors V) by the primary sorting conveyor U, in order from the first primary sorting conveyor U1 for accumulating articles of a group for which the first sorting sign G41 is A, to the second primary sorting conveyor U2 for accumulating articles of a group for which the first sorting sign G41 is B, and then to the third primary sorting conveyor U3 for accumulating articles of a group for which the first sorting sign G41 is C.

Note that the transport of a plurality of articles B that are accumulated in the upstream accumulating unit 60 and belong to one group G3 to the downstream accumulating unit 70 starts after all of the plurality of articles B that belong to this group G3 have passed the position corresponding to the second reading apparatus S2 on the upstream transport conveyor C10. That is to say, this transport starts before all of the plurality of articles B that belong to one group G3 are accumulated in the upstream accumulating unit 60.

Articles B are accumulated on the secondary sorting conveyors V in the sequence indicated by the numbers surrounded by circles in the downstream accumulating unit 70 in FIG. 6. The article B that is accumulated furthest on the downstream side on the first primary sorting conveyor U1 and whose first and second sorting signs G41 and G42 are A and 4, respectively, is first transported to and accumulated on the fourth secondary sorting conveyor V4. Thereafter, of the group of articles for which the first sorting sign G41 is A, the article B whose second sorting sign G42 is 2 is transported to and accumulated on the second secondary sorting conveyor V2, the article B whose second sorting sign G42 is 3 is transported to and accumulated on the third secondary sorting conveyor V3, and the article B whose second sorting sign G42 is 1 is transported to and accumulated on the first secondary sorting conveyor V1, in this order. Upon completion of the transfer of the group of articles for which the first sorting sign G41 is A (i.e. the article group accumulated on the first primary sorting conveyor U1) to the secondary sorting conveyors V, next, the group of articles for which the first sorting sign G41 is B (i.e. the group of articles accumulated on the second primary sorting conveyor U2) are transported to and accumulated on the secondary sorting conveyors V. Similarly, upon completion of the transfer of the group of articles for which the first sorting sign G41 is B (i.e. the article group accumulated on the second primary sorting conveyor U2) to the secondary sorting conveyors V, next, the group of articles for which the first sorting sign G41 is C (i.e. the article group accumulated on the third primary sorting conveyor U3) are transported to and accumulated on the secondary sorting conveyors V.

Thus, articles B in a continuous sequence according to the designated sequence numbers G2 are accumulated, one by one, on the secondary sorting conveyors V when, at the latest, distribution of articles B, the number of which corresponds to the number of second sorting signs G42 (i.e. the second set number), to the secondary sorting conveyors V is complete. Accordingly, as a result of the articles B at the top (on the downstream side) accumulated on the secondary sorting conveyors V being delivered, one by one, by the downstream lifter L3, the picking robot R can pick goods from the articles B in accordance with the designated sequence numbers G2. Specifically, the articles B arranged furthest on the downstream side in the first secondary sorting conveyor V1, the second secondary sorting conveyor V2, the third secondary sorting conveyor V3, and the fourth secondary sorting conveyor V4 are delivered, in this order, to the send-out conveyor C30 using the downstream lifter L3. Thus, the picking robot R can pick goods from the articles B in accordance with the designated sequence numbers G2.

That is to say, when distributing a plurality of articles B to be sorted to which the designated sequence numbers G2 are assigned, to the plurality of primary sorting conveyors U to accumulate the articles B thereon, and then transporting the articles B from the plurality of primary sorting conveyors U to the plurality of secondary sorting conveyors V, the control unit H controls operations of the sorting unit A as follows. That is to say, in a state where a plurality of articles B to be sorted have been divided into article groups with the same number of articles B, the number of groups being the same as the number of secondary sorting conveyors V (the second set number), and in a state where the designated sequence numbers G2 assigned to the plurality of articles B included in each article group are sequential within the article group, the control unit H distributes the articles B to the primary sorting conveyors to accumulate the articles B thereon, by article group. Note that "a state where the designated sequence numbers G2 are sequential within the article group" refers to a state where the values (numbers) indicating the designated sequence numbers G2 constitute a group of sequential numbers, and does not indicate that the numbers are arranged in ascending or descending order. For example, as shown in FIG. 4, the designated sequence numbers G2 of the articles B included in the article group for which the first sorting sign G41 is A is 1 to 4. Then, as shown in FIG. 6, the articles B whose designated sequence numbers G2 are 4, 2, 3, and 1 are accumulated, in this order from the downstream side, in the first primary sorting conveyor U1. The designated sequence numbers G2 of these four articles B are 1 to 4 and are thus sequential, and this state is "a state where the designated sequence numbers G2 are sequential within the article group".

In the case of transporting a plurality of articles B to be sorted from the primary sorting conveyors U to the secondary sorting conveyors V, the control unit H controls operations of the sorting unit A to distribute the articles B to the secondary sorting conveyors V to accumulate the articles B thereon, in accordance with the designated sequence numbers G2, so that an article B with a smaller designated sequence number G2, of the articles B included in the article group, is accumulated on a secondary sorting conveyor V from which articles B are sent out earlier from the send-out conveyor C30. For example, in the mode shown in FIG. 6, the secondary sorting conveyor V from which articles B are first sent out from the send-out conveyor C30 is the first secondary sorting conveyor V1, and the secondary sorting conveyor V from which articles B are sent out lastly from the send-out conveyor C30 is the fourth secondary sorting conveyor V4. Accordingly, the article B that is accumulated furthest on the downstream side on the first primary sorting conveyor U1 (i.e. the article B whose designated sequence number G2 is 4 (and whose second sorting sign G42, which corresponds the designated sequence number within the article group, is also 4) is first accumulated on the fourth secondary sorting conveyor V4. Thereafter, the article B whose designated sequence number G2 is 2 (and whose second sorting sign G42 is also 2) is accumulated on the second secondary sorting conveyor V2, the article B whose designated sequence number G2 is 3 (and whose second sorting sign G42 is also 3) is accumulated on the third secondary sorting conveyor V3, and the article B whose designated sequence number G2 is 1 (and whose second sorting sign G42 is also 1) is accumulated on the first secondary sorting conveyor V1, in accordance with the designated sequence numbers G2.

Also, as shown in FIG. 7, there are cases where a plurality of articles B that have been received by the upstream lifter L1 and belong to one group G3 include an article B (unexpected article BB) that does not belong to this group G3 (e.g. the case where the unexpected article BB was not transported toward the discharge conveyor C40 but transported toward the sorting unit A side). In such cases, the unexpected article BB is sequentially transported to the upstream accumulating unit 60 and the downstream accumulating unit 70, and is sent out from the send-out conveyor C30. The unexpected article BB sent out from the send-out conveyor C30 is not subjected to the picking operation performed by the picking robot R, passes through the send-out conveyor C30, and is returned to an article storage shelf K via the returning conveyor C30 and the loading conveyor C2. Note that, in FIG. 7, unexpected articles BB are shown in a mode different from that of the articles B that belong to the groups G3, and the unexpected articles BB are not provided with the first sorting sign G41 and the second sorting sign G42. Also, in the mode shown as an example in FIG. 7, the number of articles in each of the groups G3 is set to 16, and a group G3 includes four (A, B, C, and D) article groups, unlike in the mode described above with reference to FIGS. 4 to 6.

If, as a result of transporting unexpected articles BB to the upstream accumulating unit 60 and the downstream accumulating unit 70, the number of articles B that are present on the primary sorting conveyors U or the secondary sorting conveyors V exceeds the number of articles that can be accumulated on each of the branch accumulating units, the control unit H stops transporting articles B and issues an abnormality notification. In this embodiment, the primary sorting conveyor U (e.g. the second primary sorting conveyor U2) with the smallest number of accumulated articles B, of the plurality of primary sorting conveyors U in the upstream accumulating unit 60, is selected, and unexpected articles BB are transported to the selected primary sorting conveyor U. Here, there are cases where, as a result of transporting unexpected articles BB, when an article B that belongs to a group G (in the example in FIG. 7, the article B whose first sorting sign G41 is B and second sorting sign G42 is 3) is transported to a primary sorting conveyor U, the number of articles on the primary sorting conveyor U to which this article B is to be transported (in the example in FIG. 7, the second primary sorting conveyor U2) exceeds the number of articles that can be accumulated thereon, as shown in FIG. 7. In that case, the control unit H stops the article rearranging apparatus E to stop transporting the articles B, and operates an alarm apparatus M (see FIG. 3) to issue an error notification. Note that the alarm apparatus M is constituted by a buzzer, a revolving light, or the like, and can be operated to notify a nearby operator of an error by means of sound or light.

Other embodiments of the article rearranging apparatus will be described below.

(1) In the above-described example, as for articles B whose article information has been read by the first reading apparatus S1 but has not been read by the second reading apparatus S2, operations of the sorting unit A and the send-out conveyor C30 are controlled to send out the articles B in accordance with the designated sequence numbers G2 from the send-out conveyor C30, based on the article information read by the first reading apparatus S1. However, a mode may alternatively be employed in which operations of the sorting unit A and the send-out conveyor C30 are controlled so that articles B whose article information has not been read by the second reading apparatus S2 are sequentially transported to the upstream accumulating unit 60 and the downstream accumulating unit 70, are sent out from the send-out conveyor C30, and are then returned to the article storage shelves K or the upstream transport conveyor C10, similarly to unexpected articles BB.

(2) In the above-described example, the discharge apparatus F only discharges articles B whose article information has not been read by the first reading apparatus Si, from the upstream transport conveyor C10. However, the discharge apparatus F may alternatively send out, from the upstream transport conveyor C10, an article B whose article information has been read by the first reading apparatus S1 but whose group G3 differs from the group G3 of articles B transported immediately before and after this article B, in addition to articles B whose article information has not been read by the first reading apparatus S1.

(3) In the above-described example, each primary sorting conveyor U is configured so that the second set number of more of articles B can be accumulated in a state of being arranged in a line in the transportation direction X, and more articles B than the number of articles B that belong to one group G3 can be accumulated in the upstream accumulating unit 60. However, a configuration may alternatively be employed in which the same number of articles B as the number of articles B that belong to one group G3 can be accumulated in the upstream accumulating unit 60. In the case where more articles B than the number of articles B that belong to one group G3 can be accumulated in the upstream accumulating unit 60, each primary sorting conveyor U may be configured so that more than twice the first set number or more of articles B can be accumulated in a state of being arranged in a line in the transportation direction X, and articles B that belong to two groups G3 can be accumulated in the upstream accumulating unit 60. In the above description, the first set number and the second set number are the same number, but the first set number and the second set number may alternatively be different numbers.

(4) In the above-described example, each secondary sorting conveyor V is configured so that the first set number of more of articles B can be accumulated in a state of being arranged in a line in the transportation direction X, and the same number of articles B as the number of articles B that belong to one group G3 can be accumulated in the downstream accumulating unit 70. However, a configuration may alternatively be employed in which each secondary sorting conveyor V is configured so that more articles B than the first set number can be accumulated in a state of being arranged in a line in the transportation direction X, and more articles B than the number of articles B that belong to one group G3 can be accumulated in the downstream accumulating unit 70. Alternatively, a configuration may be employed in which each secondary sorting conveyor V is configured so that less articles B than the first set number can be accumulated in a state of being arranged in a line in the transportation direction X, and less articles B than the number of articles B that belong to one group G3 can be accumulated in the downstream accumulating unit 70. In this case, it is conceivable that transport of articles B from the downstream accumulating unit 70 to the send-out conveyor C30 and transport of articles B from the upstream accumulating unit 60 to the downstream accumulating unit 70 are performed simultaneously.

(5) In the above-described example, a plurality of primary sorting conveyors U are installed so as to overlap each other when viewed in the up-down direction Z. However, a plurality of primary sorting conveyors U may alternatively be installed parallel to each other when viewed in the up-down direction Z. Also, in the above-described example, a plurality of secondary sorting conveyors V are installed so as to overlap each other when viewed in the up-down direction Z. However, a plurality of secondary sorting conveyors V may alternatively be installed parallel to each other when viewed in the up-down direction Z. In such cases, the upstream lifter L1, the intermediate lifter L2, and the downstream lifter L3 can be a conveyor or a self-running truck that can transport articles B while merging or branching transport paths in the horizontal direction.

(6) In the above-described example, the accumulation-transport unit is constituted by two stages, which are the final accumulating unit (downstream accumulating unit 70) that is arranged furthest on the downstream side in the transportation direction X, and the upstream accumulating unit 60 that is arranged adjacent, on the upstream side X1, to the final accumulating unit. However, three or more accumulation-transport units may be provided to form three stages. In this case, each article B that is assigned a designated sequence number G2 is given one piece of sequence number identification information and two pieces of article group identification information, in accordance with the designated sequence number G2. Thus, articles B can be distributed to the respective conveyors in each of the three-stage accumulation-transport units. In this case as well, a plurality of articles B to be sorted can be distributed and accumulated in order from a smaller designated sequence number G2 in the final branch accumulating units. Thus, articles B can be sent out in the shortest possible time after the articles B have been received by the receiving unit.

Similarly, in the case where the accumulation-transport unit is constituted by n stages, each article B that is assigned a designated sequence number G2 is given one piece of sequence number identification information and n-1 pieces of article group identification information.

(7) In the above-described example, the article rearranging apparatus E is provided in an article storage facility with a picking robot R for picking goods from articles B, but the facility in which the article rearranging apparatus E is provided is not limited to such a facility. For example, the article rearranging apparatus E can be applied to a variety of facilities; for example, the article rearranging apparatus E can be used in a processing facility for processing articles B in order to rearrange articles B to be processed in a sequence required for the next processing step.

(8) In the above-described example, the upstream lifter L1, the upstream accumulating unit 60, the intermediate lifter L2, the downstream accumulating unit 70, and the send-out conveyor C30 are arranged in a straight line when viewed in a plan view, and articles B are transported in the transportation direction, in a straight line when viewed in a plan view. However, this does not necessarily need to be the case. A configuration may alternatively be employed in which the transportation direction in the upstream accumulating unit 60 is made opposite to the transportation direction in the downstream accumulating unit 70 so that the transportation direction in which articles B are transported is reversed when viewed in a plan view or a side view, or where the upstream accumulating unit 60 and the downstream accumulating unit 70 are arranged so that the transportation direction in the upstream accumulating unit 60 intersects the transportation direction in the downstream accumulating unit 70 when in a plan view, and thus, the transportation direction X in which articles B are transported curves when viewed in a plan view.

(9) In the above-described example, the set distribution sequence numbers are set for the first secondary sorting conveyor V1, the second secondary sorting conveyor V2, the third secondary sorting conveyor V3, and the fourth secondary sorting conveyor V4 in this order. However, the set distribution sequence numbers are not limited to such a sequence, and may be set in any manner. For example, the set distribution sequence numbers may alternatively be set for the fourth conveyor V4, the third secondary sorting conveyor V3, the second secondary sorting conveyor V2, and the first secondary sorting conveyor V1 in this order, or may be set for the fourth secondary sorting conveyor V4, the first secondary sorting conveyor V1, the second secondary sorting conveyor V2, and the third secondary sorting conveyor V3 in this order.

(10) Note that the configurations disclosed in the above embodiment may be combined with the configurations disclosed in the other embodiments for application, provided there is no inconsistency. Regarding other configurations as well, the embodiments disclosed in this specification are merely examples in all aspects. Accordingly, various modifications may be made as appropriate without departing from the gist of the present disclosure.

A summary of the above-described article rearranging apparatus will be described below.

An article rearranging apparatus includes: a receiving unit configured to receive articles; a send-out unit configured to send out articles; a sorting unit configured to transport articles received by the receiving unit to the send-out unit, and rearrange the articles received by the receiving unit in accordance with designated sequence numbers; and a control unit, wherein the sorting unit includes a plurality of accumulation-transport units capable of accumulating and transporting a plurality of articles, the accumulation-transport units being arranged in a transportation direction that is a direction extending from the receiving unit toward the send-out unit, of the plurality of accumulation-transport units, an accumulation-transport unit arranged furthest on a downstream side in the transportation direction is a final accumulating unit, and an accumulation-transport unit arranged adjacent, on an upstream side, to the final accumulating unit is an upstream accumulating unit, each of the final accumulating unit and the upstream accumulating unit includes a plurality of branch accumulating units that are separate from each other in parallel in the transportation direction, the upstream accumulating unit includes a first set number of upstream branch accumulating units serving as the branch accumulating units, the final accumulating unit includes a second set number of final branch accumulating units serving as the branch accumulating units, and the first set number and the second set number are the same number or different numbers, the receiving unit receives groups of articles, group-by-group, wherein a sequence in each group differs from the designated sequence numbers, each of the plurality of upstream branch accumulating units can accumulate articles, the number of which is the second set number or more, in a state of being arranged in a line in the transportation direction, each of the plurality of final branch accumulating units can accumulate articles in a state of being arranged in a line in the transportation direction, the number of articles in each of the groups is smaller than or equal to a number obtained by multiplying the first set number by the second set number, as for articles of the groups, articles are grouped into article groups according to the designated sequence numbers that increase in ascending order, each article group including the second set number of articles, and the control unit controls the sorting unit and the send-out unit to transport articles received by the receiving unit to the upstream accumulating unit so that articles that belong to the same article group are accumulated on the same upstream branch accumulating unit, and articles that belong to different article groups are accumulated on different upstream branch accumulating units, to transport articles accumulated in the upstream accumulating unit to the final accumulating unit so that articles that belong to the same article group are accumulated on different final branch accumulating units, and articles of a group for which the designated sequence numbers are smaller are accumulated on the downstream side, in the transportation direction, of articles of a group for which the designated sequence numbers are larger, and to send out articles accumulated in the final accumulating unit from the send-out unit in accordance with the designated sequence numbers.

With this configuration, articles that have been received by the receiving unit and belong to one group are transported to the first set number of upstream branch accumulating units. At this time, articles that belong to the same article group are accumulated on the same upstream branch accumulating unit, and articles that belong to different article groups are accumulated on different upstream branch accumulating units. By thus accumulating articles that belong to one group in the first set number of upstream branch accumulating units, when these articles are transported to the second set number of final branch accumulating units, the articles can be transported so that articles that belong to the same article group are accumulated on different final branch accumulating units, and articles of a group with a smaller designated sequence number are accumulated further on the downstream side in the transportation direction than articles of a group with a larger designated sequence number. Furthermore, by thus accumulating articles that belong to one group in the second set number of final branch accumulating units, these articles can be sent out from the send-out unit in accordance with the designated sequence numbers.

Accordingly, even if articles received by the receiving unit are not arranged in accordance with the designated sequence number, the articles can be rearranged in a predetermined sequence by the sorting unit. As a result, an article rearranging apparatus can be provided that can send out articles received by the receiving unit in a relatively short time after being received.

Here, it is preferable that the number of articles that can be accumulated in the upstream accumulating unit is larger than the number of articles that can be accumulated in the final accumulating unit.

With this configuration, since a redundant number of articles can be accumulated in the upstream accumulating unit, even if an unexpected article, such as an article of another group or an article of an unknown group, is mixed in with a plurality of articles that are transported by group, the unexpected article can be accumulated in the upstream accumulating unit. For this reason, even if an unexpected article is mixed in, it is possible to reduce the likelihood that articles cannot be transported to the final accumulating unit due to the upstream accumulating unit being full of articles.

Also, it is preferable that the article rearranging apparatus further includes a transport conveyor configured to transport, to the receiving unit, articles taken out from an article storage shelf for storing articles, wherein the transport conveyor transport articles so that a plurality of articles that belong to the same group are arranged continuously.

With this configuration, since a plurality of articles that belong to the same group are continuously received by the receiving unit, articles that are being transported by the transport conveyor do not need to be rearranged so that the plurality of articles that belong to the same group are arranged continuously. As a result, the articles can be efficiently transported to the receiving unit.

It is preferable that the article rearranging apparatus further includes a reading apparatus configured to read article information that is provided to articles that are being transported by the transport conveyor, wherein the control unit controls, based on the article information read by the reading apparatus, operations of the sorting unit and the send-out unit so as to send out articles from the send-out unit in accordance with the designated sequence numbers, and controls operations of the sorting unit and the send-out unit so as to sequentially transport articles whose article information has not been read by the reading apparatus to the upstream accumulating unit and the final accumulating unit, and send out the articles from the send-out unit.

With this configuration, an article whose article information has not been read by the reading apparatus is sequentially transported to the upstream accumulating unit and the final accumulating unit, is sent out from the send-out unit, and is returned to an article storage shelf or a transport conveyor. Thus, even if an article whose article information has not been read by the reading apparatus is mixed in with a plurality of articles that are transported by group, the article whose article information has not been read can be sent out from the send-out unit. As a result, even if an article whose article information has not been read by the reading apparatus is mixed in, the article rearranging apparatus does not need to be stopped, and the article rearranging apparatus can continue to rearrange articles. Also, by using the upstream accumulating unit and the final accumulating unit to send out an article whose article information has not been read by a reading apparatus, an apparatus exclusively for sending out such an article is not needed, and thus, the configuration of the article rearranging apparatus can be simplified.

Also, it is preferable that, if, as a result of transporting articles whose article information has not been read by the reading apparatus to the upstream accumulating unit and the final accumulating unit, the number of articles that are present in one of the upstream branch accumulating units or one of the final branch accumulating units exceeds the number of articles that can be accumulated on each of the branch accumulating units, the control unit stops transporting articles and issues an abnormality notification.

If the number of articles that are present in the upstream branch accumulating unit or the final branch accumulating unit exceeds the number of articles that can be accumulated on each branch accumulating unit, there are cases where no more articles can then be transported to the upstream branch accumulating unit or the final branch accumulating unit, and rearrangement of articles in the sorting unit cannot be continued. In such cases, with this configuration, transportation of articles is stopped and an abnormality notification is issued, making it possible to quickly deal with an abnormality.

Also, it is preferable that the aforementioned reading apparatus serves as a second reading apparatus, and the article rearranging apparatus further includes a first reading apparatus reads the article information provided to articles that are being transported by the transport conveyer, on the upstream side, in the transportation direction, of the second reading apparatus, and a discharge apparatus, which is provided between the first reading apparatus and the second reading apparatus in the transportation direction, the discharge apparatus discharges, from the transport conveyor, articles whose article information has not been read by the first reading apparatus, and the control unit controls operations of the sorting unit and the send-out unit so as to send out articles whose article information has been read by the first reading apparatus and has not been read by the second reading apparatus, from the send-out unit in accordance with the designated sequence numbers, based on the article information read by the first reading apparatus.

With this configuration, an article whose article information has not been read by the first reading apparatus is discharged from the transport conveyor by the discharge apparatus before being transported to the receiving unit. Thus, an article whose article information is unknown can be restricted from being transported to the sorting unit. Even if article information has not been read by the second reading apparatus, if the article information has been read by the first reading apparatus, the article is subjected to rearrangement based on the article information. Accordingly, articles can be smoothly rearranged in the sorting unit.

Also, it is preferable that the control unit acquires take-out information, which is information regarding articles that have been taken out from the article storage shelf, and sets the designated sequence numbers based on the take-out information before the article information regarding all of the taken-out articles is read by the reading apparatus.

With this configuration, the designated sequence number can be set at a relatively early stage compared with the case of setting the designated sequence number based on article information read by the reading apparatus, and it is accordingly possible to start, at an early timing, rearrangement of articles received by the receiving unit.

The invention claimed is:

1. An article rearranging apparatus comprising:
a receiving unit configured to receive articles;
a send-out unit configured to send out articles;
a sorting unit configured to transport articles received by the receiving unit to the send-out unit, and rearrange the articles received by the receiving unit in accordance with designated sequence numbers; and
a control unit,
wherein the sorting unit includes a plurality of accumulation-transport units capable of accumulating and transporting a plurality of articles, the accumulation-transport units arranged in a transportation direction that is a direction extending from the receiving unit toward the send-out unit,
wherein, of the plurality of accumulation-transport units, an accumulation-transport unit arranged furthest on a downstream side in the transportation direction is a final accumulating unit, and an accumulation-transport unit arranged adjacent, on an upstream side, to the final accumulating unit is an upstream accumulating unit,
wherein each of the final accumulating unit and the upstream accumulating unit includes a plurality of branch accumulating units that are separate from each other in parallel in the transportation direction,
wherein the upstream accumulating unit includes a first set number of upstream branch accumulating units serving as the branch accumulating units, the final accumulating unit includes a second set number of final branch accumulating units serving as the branch accumulating units, and the first set number and the second set number are the same number or different numbers,
wherein the receiving unit receives groups of articles, group-by-group, and a sequence in each group differs from the designated sequence numbers,
wherein each of the plurality of upstream branch accumulating units can accumulate articles, the number of which is the second set number or more, the articles arranged in a line in the transportation direction,
wherein each of the plurality of final branch accumulating units can accumulate articles, the articles arranged in a line in the transportation direction,
wherein the number of articles in each of the groups is smaller than or equal to a number obtained by multiplying the first set number by the second set number,
wherein, as for articles of the groups, articles are grouped into article groups according to the designated sequence numbers that increase in ascending order, each article group including the second set number of articles, and
wherein the control unit controls the sorting unit and the send-out unit to:
transport articles received by the receiving unit to the upstream accumulating unit so that articles that belong to the same article group are accumulated on the same upstream branch accumulating unit, and articles that belong to different article groups are accumulated on different upstream branch accumulating units,
transport articles accumulated in the upstream accumulating unit to the final accumulating unit so that articles that belong to the same article group are accumulated on different final branch accumulating units, and articles of a group for which the designated sequence numbers are smaller are accumulated on the downstream side, in the transportation direction, of articles of a group for which the designated sequence numbers are larger, and
send out articles accumulated in the final accumulating unit from the send-out unit in accordance with the designated sequence numbers.

2. The article rearranging apparatus according to claim 1, wherein the number of articles that can be accumulated in the upstream accumulating unit is larger than the number of articles that can be accumulated in the final accumulating unit.

3. The article rearranging apparatus according to claim 1, further comprising:
a transport conveyor configured to transport, to the receiving unit, articles taken out from an article storage shelf for storing articles, and
wherein the transport conveyor transport articles so that a plurality of articles that belong to the same group are arranged continuously.

4. The article rearranging apparatus according to claim 3, further comprising:
a reading apparatus configured to read article information that is provided to articles that are being transported by the transport conveyor, and
wherein the control unit controls, based on the article information read by the reading apparatus, operations of the sorting unit and the send-out unit so as to send out articles from the send-out unit in accordance with the designated sequence numbers, and controls operations of the sorting unit and the send-out unit so as to sequentially transport articles whose article information has not been read by the reading apparatus to the upstream accumulating unit and the final accumulating unit, and send out the articles from the send-out unit.

5. The article rearranging apparatus according to claim 4, wherein if, as a result of transporting articles whose article information has not been read by the reading apparatus to the upstream accumulating unit and the final accumulating unit, the number of articles that are present in one of the upstream branch accumulating units or one of the final branch accumulating units exceeds the number of articles that can be accumulated on each of the branch accumulating units, the control unit stops transporting articles and issues an abnormality notification.

6. The article rearranging apparatus according to claim 3, further comprising:
a reading apparatus configured to read article information that is provided to articles that are being transported by the transport conveyor, and
wherein:
the reading apparatus includes a first reading apparatus and a second reading apparatus,
the first reading apparatus reads the article information on the upstream side, in the transportation direction, of the second reading apparatus,
the article rearranging apparatus further comprises a discharge apparatus, which is provided between the first reading apparatus and the second reading apparatus in the transportation direction,
the discharge apparatus discharges, from the transport conveyor, articles whose article information has not been read by the first reading apparatus, and
the control unit controls operations of the sorting unit and the send-out unit so as to send out articles whose article information has been read by the first reading apparatus and has not been read by the second reading apparatus from the send-out unit in accordance with the designated sequence numbers, based on the article information read by the first reading apparatus.

7. The article rearranging apparatus according to claim 4, wherein the control unit acquires take-out information, which is information regarding articles that have been taken out from the article storage shelf, and sets the designated sequence numbers based on the take-out information before the article information regarding all of the taken-out articles is read by the reading apparatus.

8. The article rearranging apparatus according to claim 5, wherein the control unit acquires take-out information, which is information regarding articles that have been taken out from the article storage shelf, and sets the designated sequence numbers based on the take-out information before the article information regarding all of the taken-out articles is read by the reading apparatus.

9. The article rearranging apparatus according to claim 6, wherein the control unit acquires take-out information, which is information regarding articles that have been taken out from the article storage shelf, and sets the designated sequence numbers based on the take-out information before the article information regarding all of the taken-out articles is read by the reading apparatus.

10. The article rearranging apparatus according to claim 2, further comprising:
    a transport conveyor configured to transport, to the receiving unit, articles taken out from an article storage shelf for storing articles, and
    wherein the transport conveyor transport articles so that a plurality of articles that belong to the same group are arranged continuously.

11. The article rearranging apparatus according to claim 10, further comprising:
    a reading apparatus configured to read article information that is provided to articles that are being transported by the transport conveyor, and
    wherein the control unit controls, based on the article information read by the reading apparatus, operations of the sorting unit and the send-out unit so as to send out articles from the send-out unit in accordance with the designated sequence numbers, and controls operations of the sorting unit and the send-out unit so as to sequentially transport articles whose article information has not been read by the reading apparatus to the upstream accumulating unit and the final accumulating unit, and send out the articles from the send-out unit.

12. The article rearranging apparatus according to claim 11, wherein, if, as a result of transporting articles whose article information has not been read by the reading apparatus to the upstream accumulating unit and the final accumulating unit, the number of articles that are present in one of the upstream branch accumulating units or one of the final branch accumulating units exceeds the number of articles that can be accumulated on each of the branch accumulating units, the control unit stops transporting articles and issues an abnormality notification.

13. The article rearranging apparatus according to claim 10, further comprising:
    a reading apparatus configured to read article information that is provided to articles that are being transported by the transport conveyor, and
    wherein:
    the reading apparatus includes a first reading apparatus and a second reading apparatus,
    the first reading apparatus reads the article information on the upstream side, in the transportation direction, of the second reading apparatus,
    the article rearranging apparatus further comprises a discharge apparatus, which is provided between the first reading apparatus and the second reading apparatus in the transportation direction,
    the discharge apparatus discharges, from the transport conveyor, articles whose article information has not been read by the first reading apparatus, and
    the control unit controls operations of the sorting unit and the send-out unit so as to send out articles whose article information has been read by the first reading apparatus and has not been read by the second reading apparatus, from the send-out unit in accordance with the designated sequence numbers, based on the article information read by the first reading apparatus.

14. The article rearranging apparatus according to claim 11, wherein the control unit acquires take-out information, which is information regarding articles that have been taken out from the article storage shelf, and sets the designated sequence numbers based on the take-out information before the article information regarding all of the taken-out articles is read by the reading apparatus.

15. The article rearranging apparatus according to claim 12, wherein the control unit acquires take-out information, which is information regarding articles that have been taken out from the article storage shelf, and sets the designated sequence numbers based on the take-out information before the article information regarding all of the taken-out articles is read by the reading apparatus.

16. The article rearranging apparatus according to claim 13, wherein the control unit acquires take-out information, which is information regarding articles that have been taken out from the article storage shelf, and sets the designated sequence numbers based on the take-out information before the article information regarding all of the taken-out articles is read by the reading apparatus.

* * * * *